UNITED STATES PATENT OFFICE.

GEORGE FRANÇOIS JAUBERT, OF PARIS, FRANCE.

PROCESS OF PURIFYING ACETYLENE GAS.

No. 850,010.

Specification of Letters Patent.

Patented April 9, 1907.

Application filed November 24, 1905. Serial No. 288,984.

*To all whom it may concern:*

Be it known that I, GEORGE FRANÇOIS JAUBERT, a citizen of the French Republic, and a resident in Paris, France, (155 Boulevard Malesherbes, Paris, France,) have invented a certain new and useful Process for the Purification of Acetylene Gas, of which the following is a specification.

This invention has for its object an improved process for eliminating from raw acetylene gas the phosphoreted hydrogen, which, as is known, constitutes the impurity which is the most undesirable and at the same time the most difficult to eliminate. For this purpose sulfuric acid, hydrochloric acid, and other acids have already been used, but without satisfactory result, owing to the fact that they have not been used in a sufficiently concentrated state, and they are not liable to keep during a long time the property of retaining the phosphoreted hydrogen. After a time this phosphoreted hydrogen is entirely given up and acid in such a condition is not capable of reutilization.

The applicant has found that when the acid is used in a sufficiently concentrated state and when arsenious anhydrid or any other arsenic derivative is added to the acid there is at once formed a compound of arsenic and phosphorus which is completely insoluble and of reddish color and precipitates, so that the acid used for washing the gas is always ready for purifying sufficient quantities of acetylene gas.

The process according to this invention therefore consists in passing the acetylene gas as soon as it is formed into appropriate washing-tanks of any known construction which contain sulfuric acid concentrated at 62°-64° Baumé, saturated with arsenious anhydrid or any appropriate arsenic derivative, such as white arsenic.

The operation of the process will be easily understood from the foregoing statement, and it is seen that as the acid will never lose the property of eliminating the phosphoreted hydrogen the process will be carried out as a continuous process.

Instead of using solution as above in a liquid state the acetylene gas may also be caused to circulate in a vessel containing infusorial earth, sand, pumice-stone, or any other porous material impregnated with the acids indicated above.

What I claim is—

1. The process for purifying acetylene gas which consists in passing the gas through concentrated hydrochloric acid, saturated with arsenious anhydrid or other arsenic derivative, whereby to regenerate the acid and obtain a complete purification of the gas.

2. The process for purifying acetylene gas, which consists in passing said gas through concentrated hydrochloric acid saturated with an arsenic derivative.

3. The process of purifying acetylene gas which consists in passing such gas through a concentrated acid saturated with an arsenic derivative.

Dated this 11th day of November, 1905.

GEORGE FRANÇOIS JAUBERT.

In presence of—
   FREDERIC M. CAULDWELL,
   HENRY SCHWAB.